United States Patent
Hovarth et al.

[15] 3,673,111
[45] June 27, 1972

[54] METHOD FOR THE MANUFACTURE OF SOLID PHOSPHORIC ACID CATALYST

[72] Inventors: Edward Hovarth, Woodland Hills, Calif.; Gary Youngman, Des Plaines, Ill.

[73] Assignee: Universal Oil Products Company, Des Plaines, Ill.

[22] Filed: July 13, 1970

[21] Appl. No.: 54,612

[52] U.S. Cl. .................................252/435, 260/683.15 C
[51] Int. Cl. ..........................................................B01j 11/82
[58] Field of Search..................................................252/435

[56] References Cited
UNITED STATES PATENTS

| | | | |
|---|---|---|---|
| 2,231,452 | 2/1941 | Morrell | 252/435 |
| 2,275,182 | 3/1942 | Ipatieff et al | 252/435 |
| 3,213,036 | 10/1965 | Morrell | 252/435 |

*Primary Examiner*—Patrick P. Garvin
*Attorney*—James R. Hoatson, Jr. and Robert W. Welch

[57] ABSTRACT

A process for the manufacture of a solid phosphoric acid catalyst. A siliceous adsorbent is admixed with a polyphosphoric acid. The mixture is heated at an elevated temperature and thereafter extruded. High activity - high strength extrudate particles are produced by drying the extrudate first in a steam atmosphere and then in a dry air atmosphere.

6 Claims, No Drawings

METHOD FOR THE MANUFACTURE OF SOLID PHOSPHORIC ACID CATALYST

Hydrocarbon conversion catalysts, and specifically olefin polymerization catalysts, have heretofore been prepared by admixing a solid adsorbent with an oxygen acid of phosphorus and drying and calcining the resultant mixture to form a solid catalyst, usually in the extruded form. The prior art further discloses solid catalysts of this type which contain components other than the oxygen acid of phosphorus and the solid adsorbent, examples of such components including metals such as nickel, zirconium, manganese, cobalt, or salts thereof, and also carbonaceous materials such as charcoal, activated charcoal, lamp black, graphite, coke, powdered coal, etc. In the manufacture of such catalyst, it has been found that drying of the catalyst particles in a steam atmosphere is highly advantageous with respect to catalyst activity. However, the advantages derived from steam drying are somewhat offset by the substantial reduction in particle crushing strength resulting therefrom.

It is an object of this invention to provide a process for the manufacture of a solid phosphoric acid hydrocarbon conversion catalyst of improved crushing strength. It is a further object to provide a solid phosphoric acid catalyst possessing a high degree of activity with respect to olefin polymerization and of improved crushing strength.

In one of its broad aspects, the present invention embodies a process for the manufacture of a solid phosphoric acid catalyst which comprises admixing a siliceous adsorbent with an oxygen acid of phosphorus and heating the mixture at a temperature of from about 100° to about 500° F., extruding the mixture and drying the extrudate particles in a steam atmosphere for a period of at least 0.5 hours at a temperature of from about 500° to about 800° F., and thereafter in a dry air atmosphere for a period of at least about 0.5 hours at a temperature of from about 550° to about 850° F.

One of the more specific embodiments of this invention comprises admixing kieselguhr with a polyphosphoric acid to form a mixture comprising from about 60 to about 80 wt. % phosphoric acid and from about 20 to about 40 wt. % kieselguhr, heating the mixture at a temperature of from about 100° to about 500° F., extruding the mixture and drying the extrudate particles in a steam atmosphere for a period of from about 0.5 to about 1.5 hours at a temperature of from about 650° to about 750° F., said steam atmosphere comprising from about 20 to about 35 wt. % water vapor, thereafter drying the particles in a dry air atmosphere for a period of from about 0.5 to about 1.5 hours at a temperature of from about 700° to about 800° F.

Other objects and embodiments of this invention will become apparent in the following detailed specification.

The essential and active ingredient of the solid catalyst herein contemplated is an acid of phosphorus, preferably one in which the phosphorus has a valence of +5. The acid may constitute from about 60 to about 80 wt. % or more of the catalyst mixture ultimately produced, and in most cases is over 50 wt. % thereof. Of the various acids of phosphorus, orthophosphoric acid ($H_3PO_4$) and pyrophosphoric acid ($H_4P_2O_7$) find general application in the primary mixtures, due mainly to their cheapness and to the readiness with which they may be procured, although the invention is not restricted to their use but may employ any of the other acids of phosphorus insofar as they are adaptable. It is not intended to infer, however, that the different acids of phosphorus, which may be employed will produce catalysts which have identical affects upon any given organic reactions as each of the catalysts produced from different acids and by slightly varied procedure will exert its own characteristic action.

In using orthophosphoric acid as a primary ingredient, different concentrations of the aqueous solution may be employed from approximately 75 percent to 100 percent, or acid containing some free phosphorus pentoxide may even be used. By this is meant that the ortho acid may contain a definite percentage of the pyro acid corresponding to the primary phase of dehydration of the orthophosphoric acid. Within these concentration ranges, the acids will be liquids of varying viscosities, and readily mix with adsorbent materials. In practice, it has been found that pyrophosphoric acid corresponding to the formula $H_4P_2O_7$ can be incorporated with siliceous adsorbents at temperatures somewhat above its melting point (142° F.) and that the period of heating which is given to the pyro acid-adsorbent mixtures may be different from that used when the ortho acid is so employed.

Triphosphoric acid which may be represented by the formula $H_5P_3O_{10}$ may also be used as a starting material for preparation of the catalyst of this invention. These catalytic compositions may also be prepared from the siliceous materials mentioned herein and phosphoric acid mixtures containing orthophosphoric, pyrophosphoric, triphosphoric, and other polyphosphoric acids.

Another acid of phosphorus which may be employed in the manufacture of composite catalysts according to the present invention is tetraphosphoric acid. It has the general formula $H_6P_4O_{13}$ which corresponds to the double oxide formula $3H_2O \cdot 2P_2O_5$ which in turn may be considered as the acid resulting when three molecules of water are lost by four molecules of orthophosphoric acid ($H_3PO_4$). The tetraphosphoric acid may be manufactured by gradual and controlled dehydration by heating of orthophosphoric acid or pyrophosphoric acid or by adding phosphorus pentoxide to these acids in proper amounts. When the latter procedure is followed, phosphoric anhydride is added gradually until it amounts to 520 wt. % of the total water present. After a considerable period of standing at ordinary temperatures, the crystals of the tetraphosphoric acid separate from the viscous liquid and it is found that these crystals melt as approximately 93° F. and have a specific gravity of 1.1886 at a temperature of 60° F. However, it is unnecessary to crystalize the tetraphosphoric acid before employing it in the preparation of the solid catalyst inasmuch as the crude tetraphosphoric acid mixture may be incorporated with the siliceous adsorbent and other catalyst ingredients.

The material which may be employed as adsorbents or carries for oxygen acids of phosphorus are divided roughly into two classes. The first comprises materials of predominantly siliceous character and includes diatomaceous earth, Kieselguhr, and artificially prepared porous silica. The second class of materials which may be employed either alone or in conjunction with the first class comprises generally certain members of the class of alumina silicates and includes such naturally occurring substances as various fuller's earth and clays such as bentonite, montmorillonite, acid treated clays and the like. Each adsorbent or supporting material which may be used will exert its own specific influence upon the net effectiveness of the catalyst composite which will not necessarily be identical with that of other members of the class.

The catalyst of the present invention may be prepared by admixing a diatomaceous earth, such as kieselguhr or other siliceous adsorbent material, with an acid of phosphorus such as orthophosphoric acid, pyrophosphoric acid, triphosphoric acid or tetraphosphoric acid. The starting materials used in this catalyst preparation process are generally mixed at a temperature of from about 100° to about 500° F. to form an aggregate in which the phosphoric acid content is usually a major portion by weight, although a temperature in the upper range of from about 200° to about 500° F. is often needed. The aggregate formed by the phosphoric acids and the siliceous adsorbent is a slightly moist to almost dry material which on being compressed becomes sufficiently plastic to permit extrusion and cutting operations to produce catalyst particles.

The conditions at which the wet extrudate particles are subsequently dried have been observed to have a significant and substantial effect on the properties of the finished catalyst. For example, it has been observed that a drying atmosphere having a high moisture content tends to produce a catalyst product of relatively high activity. However, coupled with the high activity is a substantial loss in crushing strength of the catalyst particles. A unique two-step drying sequence has now been discovered whereby the improved catalyst activity, afforded through utilization of a high moisture content drying atmosphere, is retained without sacrificing the crushing strength of the catalyst particles. Thus, it has been discovered that drying the extrudate particles first in a steam atmosphere and then in a dry air atmosphere will yield an extrudate product of high activity as well as crushing strength. In accordance with the present invention, the extrudate particles are dried in a steam atmosphere for a period of at least about 0.5 hours at a temperature of from about 500° to about 800° F. and thereafter in a dry air atmosphere for a period of at least about 0.5 hours at a temperature of from about 550° to about 850° F. In a preferred embodiment, the extrudate particles are dried in a steam atmosphere for a period of from about 0.5 to about 1.5 hours at a temperature of from about 650° to about 750° F. and thereafter in a dry air atmosphere for a period of from about 0.5 to about 1.5 hours at a temperature of from about 700° to about 800° F., the aforesaid steam atmosphere comprising from about 20 to about 30 wt. % or more water vapor. The catalyst thus prepared is active for promoting the polymerization of olefinic hydrocarbons, particularly for polymerizing normally aqueous olefinic hydrocarbons to form normally liquid hydrocarbons suitable for use as constituents of gasoline. When employed in the conversion of olefinic hydrocarbons into polymers, the catalyst formed as heretofore set forth, is preferably employed as a granular layer in a heated reactor which is generally made from steel, and through which the preheated hydrocarbon fraction is directed. Thus, the solid catalyst of this process may be employed for treating mixtures of olefin-containing hydrocarbon vapors to effect olefin polymerization, but the same catalyst may also be used at operating conditions suitable for maintaining liquid phase operation during polymerization of olefinic hydrocarbons, such as butylenes, to produce gasoline fractions. When employed in the polymerization of normally gaseous olefins, the formed catalyst particles are generally placed in a vertical, cylindrical treating tower and the olefin-containing gas mixture is passed downwardly therethrough at a temperature of from about 350° to about 550° F. and at a pressure of from about 100 to about 1,500 psi. These conditions are particularly applicable when dealing with olefin-containing material such as stabilizer reflux which may contain from approximately 10 to 50 percent or more of propylene and butylenes. When operating on a mixture comprising essentially propylene and butylenes, this catalyst is effective at conditions favoring the maximum utilization of both normal butylene and isobutylene which involves mixed polymerization at temperatures of from about 250° to about 325° F. and at a pressure of from about 500 to about 1,500 psi.

The catalyst of this invention, when being used for promoting miscellaneous organic reactions, will be employed in essentially the same way as they are used when polymerizing olefins, in that the reactions are essentially in the vapor phase, and that they also may be employed in suspension in liquid phase and various types of equipment.

With suitable modifications in the details of operation, the present type of catalyst may be employed in a large number of organic reactions including polymerization of olefins as already mentioned. Typical reactions for which the present type of catalyst may be used include the alkylation of cyclic compounds with olefins, the cyclic compounds including aromatics, polycyclic compounds, naphthenes, and phenols; condensation reactions such as those occurring between ethers and aromatics, alcohols and aromatics, phenols and aldehydes, etc.; reactions involving the hydrohalogenation of unsaturated organic compounds, isomerization reactions; ester formation by the interaction of carboxcyclic acids and olefins; and the like. The specific procedures for utilizing the present type of catalyst in miscellaneous organic reactions will be determined by the chemical and physical characteristics and the phase of the reacting constituents.

During use of these catalysts in vapor phase polymerization and other vapor phase treatments of organic compounds, it is often of value to add small amounts of moisture to prevent excessive dehydration and subsequent decrease in catalyst activity and in order to substantially prevent loss of water from the catalyst. An amount of water or water vapor such as steam is added to the charged olefin-containing gas so as to substantially balance the vapor pressure of the catalyst. This amount of water vapor varies from about 0.1 to about 6 percent by volume of the organic material charged.

The following examples are presented in illustration of the method of this invention and are not intended as an undue limitation on the generally broad scope of the invention as set out in the appended claims.

EXAMPLE I

A solid phosphoric acid catalyst was prepared by admixing diatomaceous earth with polyphosphoric acid (86.17 percent $P_2O_5$) previously heated to 340° F., the diatomaceous earth being admixed with the acid in a weight ratio of about 1:2. The resulting powdery composite was extruded and the wet extrudate particles dried for 70 minutes at 700° F. with air containing about 30 percent water vapor, the hot gases being passed upwardly through the extrudate particles distributed in a moving belt conveyor. The crushing strength of the catalyst particles was 21.7 lbs., the crushing strength of this and subsequent catalysts being determined with an apparatus constructed to apply force continuously and at a uniform rate beginning with a zero load. The crushing strength was determined as the arithmetic average of the force required to crush each particle of a given member of individual particles.

The catalyst thus prepared was placed in a fixed bed of a vertical tubular reactor and a light hydrocarbon feed stock comprising 37 percent olefins as propylene was continuously charged thereto in a once-through type of operation. The gaseous hydrocarbon feed stock was charged upflow through the catalyst bed at a gaseous hourly space velocity of 0.2, the reactor being maintained at about 1,000 psi. and at a temperature of 400° F. A 76 percent conversion of propylene to propylene polymer was achieved in this once-through type of operation.

EXAMPLE II

A solid phosphoric acid catalyst was prepared substantially as described in the previous example except that the steam dried product was further dried in a batch kiln for 70 minutes at 750° F. in a dry air atmosphere. In this instance, the crushing strength of the extrudate particles averaged 36.5 lbs. as opposed to 21.7 lbs. of the previous example, and a 78 percent conversion of propylene to propylene polymer at the conditions of the proceding example.

We claim as our invention:

1. In a process for the manufacture of a solid phosphoric acid catalyst which comprises admixing a diatomaceous earth with an oxygen acid of phosphorus in proportions to form a mixture comprising from about 60 to about 80 wt. % oxygen acid of phosphorus and from about 20 to about 40 wt. % diatomaceous earth, heating the mixture at a temperature of from about 100° to about 500° F., extruding the mixture and drying the extrudate particles the improvement which comprises drying the resulting wet extrudate particles in a steam atmosphere for a period of at least about 0.5 hours at a temperature of from about 500° to about 800° F., and thereafter in a dry air atmosphere for a period of at least about 0.5 hours at a temperature of from about 550° to about 850° F.

2. The process of claim 1 further characterized in that said oxygen acid of phosphorus is a polyphosphoric acid.

3. The process of claim 1 further characterized in that said mixture is heated at a temperature of from about 250° to about 450° F.

4. The process of claim 1 further characterized in that said extrudate particles are dried in a steam atmosphere for a period of at least about 0.5 hours at a temperature of from about 650° to about 750° F. and thereafter in a dry air atmosphere for a period of at least about 0.5 hours at a temperature of from about 700° to about 800° F.

5. The process of claim 1 further characterized in that said extrudate particles are dried in said steam atmosphere at said temperature for a period of from about 0.5 to about 1.5 hours and thereafter in said dry air atmosphere at said temperature for a period of from about 0.5 to about 1.5 hours.

6. The process of claim 1 further characterized in that said steam atmosphere comprises from about 20 to about 35 wt. % water vapor.

* * * * *